(12) United States Patent
Zimmerman (10) Patent No.: US 7,549,369 B2
(45) Date of Patent: Jun. 23, 2009

(54) FLAVOR INFUSION COOKING DEVICE AND METHOD

(76) Inventor: Harry Zimmerman, 310 Comstock Ave., Los Angeles, CA (US) 90024

( * ) Notice: Subject to any disclaimer, the term of this patent is extended or adjusted under 35 U.S.C. 154(b) by 842 days.

(21) Appl. No.: 10/951,078

(22) Filed: Sep. 27, 2004

(65) Prior Publication Data
US 2006/0068067 A1 Mar. 30, 2006

(51) Int. Cl.
*A47J 37/00* (2006.01)
*A23L 1/22* (2006.01)

(52) U.S. Cl. .............................. 99/532; 99/345; 99/352; 222/146.5

(58) Field of Classification Search .................. 99/332, 99/532
See application file for complete search history.

(56) References Cited

U.S. PATENT DOCUMENTS

| | | | |
|---|---|---|---|
| 1,888,542 A * | 11/1932 | Rosberg ........................ 99/532 |
| 1,982,213 A * | 11/1934 | Hopkins ....................... 219/385 |
| 2,470,481 A * | 5/1949 | Freeman ....................... 604/114 |
| 2,544,316 A * | 3/1951 | Higgins .......................... 99/532 |
| 2,617,349 A * | 11/1952 | Tucker ........................... 99/483 |
| 2,620,789 A * | 12/1952 | Gregory ......................... 99/468 |
| 2,827,902 A * | 3/1958 | Thorp ........................... 604/408 |
| 2,835,480 A * | 5/1958 | Perez ..................... 165/104.21 |
| 2,850,211 A * | 9/1958 | Fernandez ..................... 222/67 |
| 3,035,508 A * | 5/1962 | Nelson .......................... 99/532 |
| 3,149,555 A * | 9/1964 | Baum et al. ................... 99/532 |
| 3,194,438 A * | 7/1965 | Walker et al. ................ 222/630 |
| 3,232,209 A * | 2/1966 | Earl et al. ...................... 99/531 |
| 3,507,207 A * | 4/1970 | Rogers et al. .................. 99/532 |
| 3,511,164 A * | 5/1970 | Peckenpaugh et al. ........ 99/532 |
| 3,718,083 A * | 2/1973 | Walters ......................... 99/532 |
| 3,723,851 A * | 3/1973 | Johnson et al. .............. 222/132 |
| 3,734,001 A * | 5/1973 | Poster ........................... 99/532 |
| 3,739,713 A * | 6/1973 | Kudale et al. .................. 99/533 |
| 3,756,236 A * | 9/1973 | Murray et al. ............... 604/145 |
| 3,777,655 A * | 12/1973 | Ainsworth ..................... 99/532 |
| 3,850,090 A * | 11/1974 | Walters et al. ................. 99/533 |
| RE28,292 E * | 1/1975 | Piper ............................. 99/483 |
| 3,916,777 A * | 11/1975 | Earl ............................... 99/533 |
| 3,926,339 A * | 12/1975 | Openchowski ............... 222/83 |
| 4,129,066 A * | 12/1978 | Corley ........................... 99/345 |
| 4,211,160 A * | 7/1980 | Bieser ........................... 99/532 |
| 4,254,700 A * | 3/1981 | Fleming ........................ 99/532 |
| 4,291,617 A * | 9/1981 | Miller et al. ................... 99/532 |
| 4,331,071 A * | 5/1982 | Niccolls ........................ 99/532 |
| 4,414,885 A * | 11/1983 | Kelly ............................ 99/532 |
| 4,452,132 A * | 6/1984 | Miller et al. ................... 99/483 |
| 4,657,151 A * | 4/1987 | Cabernoch .................. 215/11.6 |
| 4,690,046 A * | 9/1987 | Corominas .................... 99/533 |
| 4,810,856 A * | 3/1989 | Jovanovic .................... 219/401 |
| 4,880,535 A * | 11/1989 | Burrows ...................... 210/181 |

(Continued)

FOREIGN PATENT DOCUMENTS

DE 3703857 A1 * 8/1988

*Primary Examiner*—Joseph M Pelham
(74) *Attorney, Agent, or Firm*—Walter W. Duft (57) ABSTRACT

A device and method for infusing a heated fluid into an item being cooked. The device includes infusers adapted to penetrate into the item being cooked, a fluid reservoir for containing and heating a separate fluid that will be infused into the item being cooked, and a conduit connecting the infuser and the fluid reservoir. The infusers are contained in a cooking unit.

47 Claims, 7 Drawing Sheets

U.S. PATENT DOCUMENTS

| | | | |
|---|---|---|---|
| 4,906,485 A * | 3/1990 | Kirchhoff | 426/506 |
| 5,307,958 A * | 5/1994 | Burrows | 222/146.1 |
| 5,442,997 A * | 8/1995 | Branz et al. | 99/330 |
| 6,182,555 B1 * | 2/2001 | Scheer et al. | 99/290 |
| 6,308,862 B1 * | 10/2001 | Fillmore et al. | 222/94 |
| 6,419,971 B1 * | 7/2002 | Mather et al. | 426/510 |
| 6,487,964 B2 * | 12/2002 | Snoke et al. | 99/345 |
| 6,502,501 B1 | 1/2003 | Simon | |
| 6,658,990 B1 * | 12/2003 | Henning et al. | 99/352 |
| 6,692,783 B2 | 2/2004 | Hunter | |
| 6,725,764 B2 * | 4/2004 | Sherwin | 99/419 |
| 6,796,219 B1 * | 9/2004 | Rubin | 99/532 |
| 7,144,596 B2 * | 12/2006 | Snoke et al. | 426/644 |
| 7,147,131 B2 * | 12/2006 | Sher et al. | 222/1 |
| 2002/0100371 A1 | 8/2002 | Snoke et al. | |
| 2003/0035874 A1 | 2/2003 | Snoke et al. | |
| 2004/0118303 A1 * | 6/2004 | Alexander et al. | 99/532 |
| 2005/0077318 A1 * | 4/2005 | Macler et al. | 222/81 |
| 2007/0114242 A1 * | 5/2007 | Dodrill | 222/129 |
| 2009/0039112 A1 * | 2/2009 | Robertson et al. | 222/326 |

\* cited by examiner

FLAVOR INFUSION COOKING DEVICE AND METHOD

BACKGROUND

The invention relates to devices and method for cooking food, and more particularly to a device and method for infusing food with flavor and moisture, and also cooking food more evenly and quickly.

In the past, attempts have been made to harness the benefits of thermodynamic physics by developing and using flavor sticks. These flavor sticks are self-contained units that are inserted into the food being cooked allowing the subsequent internal pressure build up caused by heating to push out the flavors that were preloaded in the flavor stick. This type of system has numerous drawbacks and limitations. For example, by their design, each stick (when more than one is used) would have to be placed in different strategic positions in order to deliver a diverse demographical flavor footprint. This can result in each stick being exposed to different temperatures, with each stick thusly producing a different level of penetration since the internal pressure, which is a function of temperature, would be different at each point. Furthermore, since each stick is loaded individually with flavorings, there is no assurance that the concentration of ingredients would remain uniform in all the sticks. Also, since each stick can be exposed to different temperatures based on logistical positioning within the cooking medium, the concentration of flavor in the resulting vapor being infused can vary from point to point, resulting in a product with unpredictable and uneven taste. In addition, utilizing a single stick can create other logistical problems. For example, if the user places the flavor stick on the top of the item being cooked, the user would be restricted from using, at least easily, any type of liquid marinade (such as soy sauce) as gravity would cause the fluid to flow downwardly through the openings (since the pin portion would be facing down) before there was an opportunity to heat the marinade to an appropriate temperature, and as a result there would be less infusion of the flavoring and/or moisture into the item being cooked. There are likewise obvious issues dealing with the necessity of being able to turn over the item being cooked with the flavor stick and reservoir still attached. Finally, there are logistical limitations in that space and weight considerations would limit the amount of flavor, etc. that could be stored without having to be concerned with the stick toppling over or taking up too much space on the grill.

There remains a need for a cooking system and method to produce a better flavored, moister and more evenly cooked food.

BRIEF DESCRIPTION OF THE INVENTION

The invention provides a device and method for cooking food that offers improvement over other conventional cooking systems, whether they be grills, ovens, barbeques, and the like, that provides a device and method for infusing the food being cooked with additional moisture and/or flavor. The system includes a preferably substantially closed pressurized system that employs an independent and separate flavor reservoir(s), or in the alternative, a fluid compartment with a removable flavor reservoir, a separate flavor infuser or multitude of infusers that are adapted to pierce or penetrate through the surface of the food being cooked (e.g., meat, fowl, fish, vegetables, etc.) or enter a container for such items being cooked, and a connector, either rigid (manifold) or flexible, that connects the flavor reservoir(s) to the flavor infuser(s).

The connector can have a quick release connector to allow an infuser to be connected and disconnected easily and quickly.

The invention relies on three basic laws of physics, namely, (1) that with a corresponding increase in temperature an equivalent increase in pressure minus the work performed is gained ($\Delta u = Q - w$); (2) that by introducing energy a liquid can be vaporized to a gas, and (3) the law of conductivity, which teaches that certain materials are good conductors of heat so that heat will easily travel within that medium with little opposing resistance. These three principles underlie the mechanism by which the present cooking invention works.

In short, heat is used to turn a liquid such as water, a marinade (e.g., soy sauce based), a bouillon, etc., to a vapor or heated liquid. By heating the substantially enclosed flavor reservoir, the corresponding increase in pressure results in the (flavored) vapor or heated liquid being propelled out of our reservoir through the connecting plumbing or channels to the flavor infuser which is designed to pierce through the outer layers of the food to be cooked (or a container for such food) so that the pressurized moisture and flavor flow out of relief holes within infusers that are now situated within the body of the item being cooked or container therefor. This action thereby acts to marinate, flavor and/or further moisturize the item being cooked. In addition, because the flavor infusers are embedded within the body of the item being cooked, conductivity can tend to heat the infusers, which in turn transfer heat into the interior of the item being cooked which itself leads to more even and quicker cooking time in that not only is the food being cooked from the outside in, but the infusers will transfer heat energy into the food, thereby accelerating the cooking time.

By utilizing a flavor reservoir that is independent from the infusers, the device can assure that the composition of the flavor being infused into the item being cooked is more consistent throughout, first because the actual flavor and moisture being delivered is from the same source and also because the environment that is producing the flavored or moisture imbuing vapor is all being produced under a consistent environmental circumstance (e.g., same BTU's being consumed uniformly). In addition, other advantages of having an independent flavor reservoir allows for better control in matching the placement of the reservoir with the heat source. In the exemplary designs of the invention, the reservoir can either utilize the existing heating source of the cooking medium (such as the burners of an oven, the electric coils, gas burner or charcoal of a grill) or the reservoir can alternately be equipped with its own dedicated heat source allowing for even more finite adjustments independent of the internal temperature of the cooking medium. In any event, the net result is a more consistent and controllable environment for the heating and distribution of the flavor and moisture to the item being cooked.

Unlike the situation of a flavor stick, where its performance can be highly dependent upon where it is inserted, the present device will result in more uniform flavoring and moisturizing. For example, the device of the invention can be used simply to infuse moisture to an item being cooked with less concern about the orientation of insertion of the infuser, unlike the situation of a single stick system.

In lieu of providing a reservoir with a single chamber, the device and system can incorporate multiple chambers in the reservoir linked either in series or parallel so that ingredients (such as oil and water) that do not mix so readily can still be used by filling them into their own containers, or use different ingredients with different consistencies that vaporize at different energy levels. In addition, the device can employ multiple flavor reservoir that can also be connected in parallel or series. This, for example, would be able to accommodate a liquid marinade that can be stored in one chamber or in separate reservoirs, and after it evaporates, travels through a secondary chamber (or second reservoir) and bring with it the flavor of cut up garlic, onions or other flavors inherent in foods that could not easily be changed into a gas. In addition, an alternative design could include a fluid reservoir that contains a fluid compartment that can be opened and sealed closed with a detachable flavor reservoir that can be removed for filling and cleaning when not in use. The flavor reservoir may be a single chamber or multiple chambers or multi-stacked and can utilize the cooking unit's heat source or an independent heat source.

By providing the infusers and reservoir as separate components, and having an intermediary connecting channel or plumbing, the device provides more flexibility in the utilization and directing of the flavor and moisture that leaves the flavor reservoir. For example, in a system provided with multiple infusers, the infusers can be provided in parallel lines or areas in order to create different zones, allowing for greater control over the cooking process. For example, by employing a shut off valve, a user can shut of some zones while keeping others open, or certain flavors can be added to some zones while directing other flavors to other zones. In addition, because the connection plumbing can be made out of a flexible line, one or more connecting nipples can be provided along or at the end of the line allowing for accessories to be quickly attached when needed for specific application. For instance, when cooking a roast, longer infusers might be inserted, when cooking fowl movable infusers might be connected to attach to the irregular shape, etc., and an infuser designed to infuse a container can be provided (e.g., to cook items placed therein, such as vegetables.) Having intermediary channeling or plumbing allows moving of the infusers without compromising the optimum positioning of the flavor reservoir. This is an important benefit in that it allows utilizing a system having a movable infuser grid that can be moved up or down to accommodate different thickness of meat, etc. From a safety perspective, having an intermediate section between the infuser and reservoir also allows inclusion of a pressure relief valve in a non-conspicuous place that would be needed in any pressurized system.

Finally, because the reservoir is bifurcate from the infuser, there is great flexibility in how the infusers are designed and used. For instance, a series of infusers can be affixed to a grid so that instead of placing the infuser into the item being cooked, we can now place the item being cooked over the fixed infusers. This does two things, first because heat always rises, it lends itself to a more efficient and effective operation for both the conductivity of the infusers in heating the food itself and the rising of the vapors into the interior of the item being cooked. Of course, this invention contemplates other circumstances such as when the infusers are placed into the item being cooked from the top. In addition, this also allows for the user to turn the item being cooked as necessary with ease, which is required for many items being cooked, and something that would be difficult with other systems.

To the extent that some infusers in a grid pattern of infusers may not penetrate the item being cooked, the vapor exiting the non-penetrating infusers can act to provide a misting of flavor and/or moisture to the exterior of the item being cooked. Also, the system may also further include a valve system which prevents flavor and/or moisture from exiting an infuser which has not penetrated an item being cooked, e.g. spring loaded valves which only open up when depressed and/or a mechanical blocking mechanism for the individual infusers. Furthermore, the system can include a relief valve that prevents excess pressure from building up in the reservoir, pipes, and/or infusers and/or a one-way check valve to prevent pressurized fluid from back flowing.

DETAILED DESCRIPTION OF THE INVENTION

Figure 1:
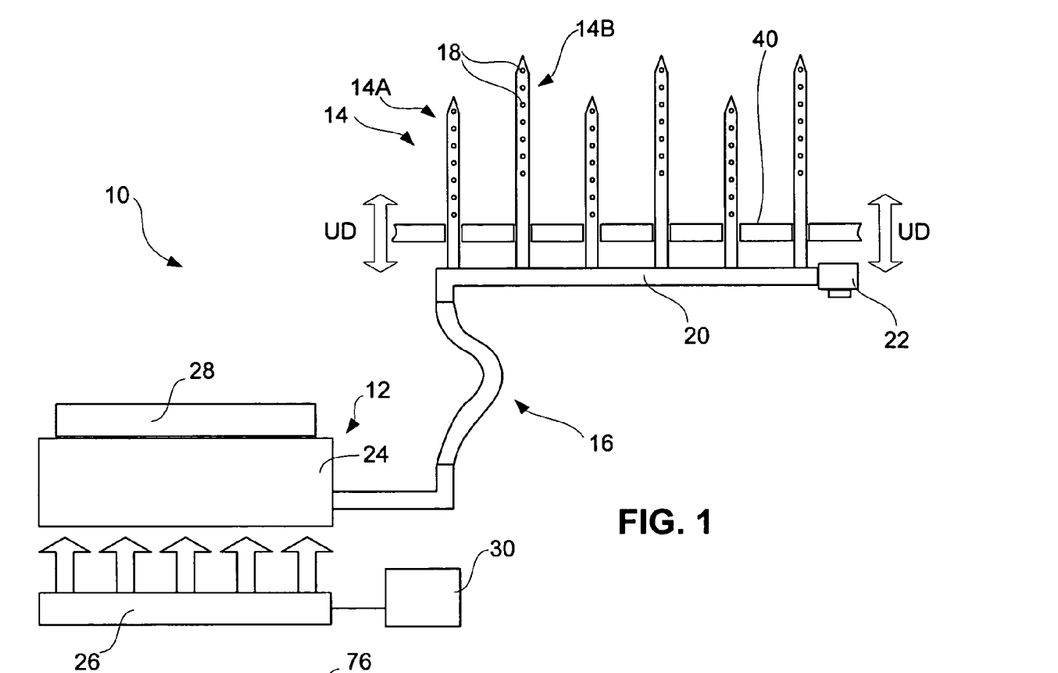
FIG. 1 is a diagrammatic side view of an exemplary embodiment of the flavor infusion device of the invention.

Referring to FIG. 1, there is shown a diagrammatic side view of an exemplary embodiment of the flavor infusion device 10. The flavor infusion device 10 comprises a reservoir 12, one or more infusers 14A and 14B, and a conduit 16 that carries fluid from the reservoir 12 out through apertures 18 in the infusers 14. As used herein, the word "fluid " means liquid, vapor and gas. The infusers 14 preferably are adapted to penetrate an item being cooked (not shown). A plurality of infusers 14 are shown attached to a fluid manifold 20 connected to the conduit 16. The lengths of the infusers 14A and 14B can be different and/or the positioning of their aperture 18 can be varied, if desired. The conduit 16 is shown connecting between the main compartment 24 and the manifold 20. A pressure relief valve 22 can be included to release any excessive pressure build-up in the device. The reservoir 12 has a main compartment 24 that retains liquids and any solids, and a heat source 26 is used to add heat to the reservoir and its contents. The reservoir 12 can either utilize the existing heating source of the cooking medium (such as the burners of an oven, the electric coils, gas burner or charcoal of a grill) or the reservoir can alternately be equipped with its own dedicated heat source allowing for even more finite adjustments independent of the internal temperature of the cooking medium. A fill opening 28 is provided to permit a user to add fluids and solids to the main compartment 24. The fluid can comprise marinades, flavor oils, juices, water, broths, etc., and solids (e.g. onion, garlic slices, spices, etc.) can be added to the main compartment to infuse the liquid with smell and flavor if desired. The heat source 26 can comprise flames, electric heating coils, etc., which is applied to heat the liquid and any solids in the reservoir 12 and convert it to heated liquid and vapor, which will be propelled out of the main compartment 26 through the conduit 16, into the manifold (meaning a rigid conduit) 20 and out through the apertures 18 in the infusers. An optional thermostat/fluid control unit 30 can be included to control the rate at which fluid exits the infusers 14 and/or act to shut off heat if the pressure in the reservoir builds up too high or too low. To control the degree of penetration of the infusers into the item being cooked, a grill rack 40 can be raised and lowered, as shown by the arrows "UD". The reservoir 12 may be located internal or external to the cooking area.

Figure 2:
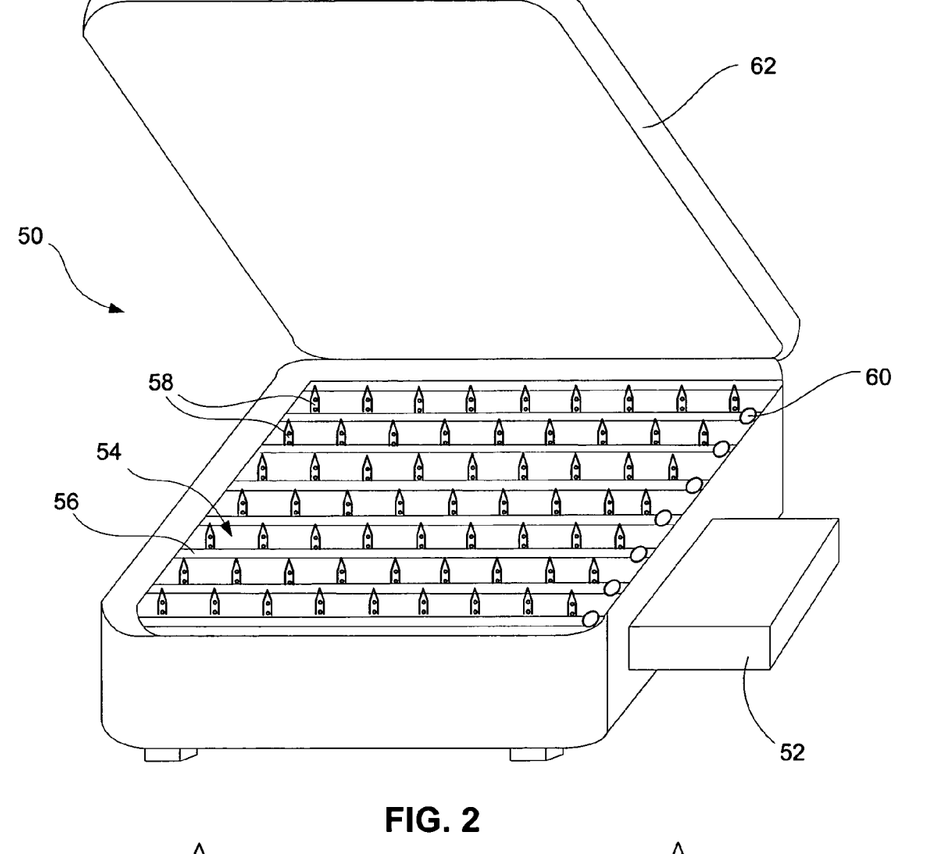
FIG. 2 is a front perspective view of an exemplary grill equipped with the flavor infusion device of the invention.

FIG. 2 is a front perspective view of an exemplary cooking unit or grill 50 equipped with the flavor infusion device of the invention. A reservoir 52 is shown outside of a cooking area 54 that has a grill rack 56, through which extends a plurality of infusers 58. In this embodiment, the grill rack 56 can incorporate the conduit or manifold that carries the fluid from the reservoir to the infusers and individual valves 60 can be provided for controlling fluid flow through each line. A lid 62 is shown. The lines can either be connected to the conduit or to the reservoir(s) in parallel or series. This cooking unit 50 can comprise an electric grill, a gas barbeque, a charcoal barbeque unit, or any other design. While the cooking unit will preferably be closeable to retain heating therein, the cooking unit need not have a lid, door or other closure. Also, the flavor infusion device can be incorporated into an oven, or can be a unit designed to retrofit conventional ovens, grills, barbeques and the like, or in the alternative, can be a stand alone portable unit.

Figure 3:
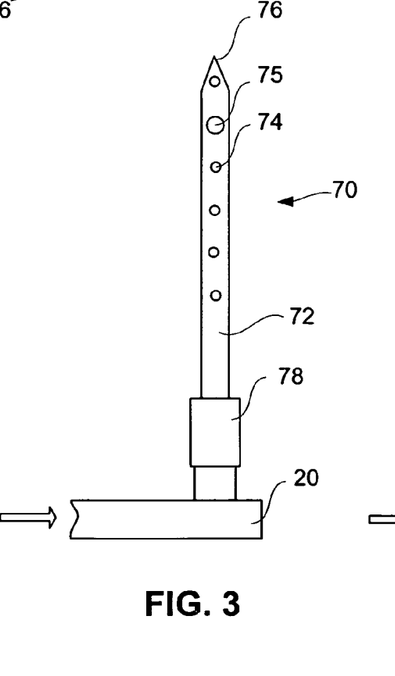
FIG. 3 is a side view of an exemplary infuser unit of the flavor infusion device with a control valve in its closed position.

FIG. 3 is a side view of an exemplary infuser unit 70 of the flavor infusion device in its closed position. It has a shaft portion 72 with a plurality of apertures 74 provided therethrough. The apertures can be of different sizes if desired (74 and 75). The shaft 72 preferably has a relatively sharp distal tip 76 adapted to penetrate an item being cooked, such as meat, fish, fowl, vegetables, etc. The exemplary infuser unit 70 optionally includes a control valve 78 (e.g. spring loaded and activated) to control whether fluid will be permitted to be released from the apertures 74. The infuser 70 is connected at its proximal end to the manifold conduit 20.

Figure 4:
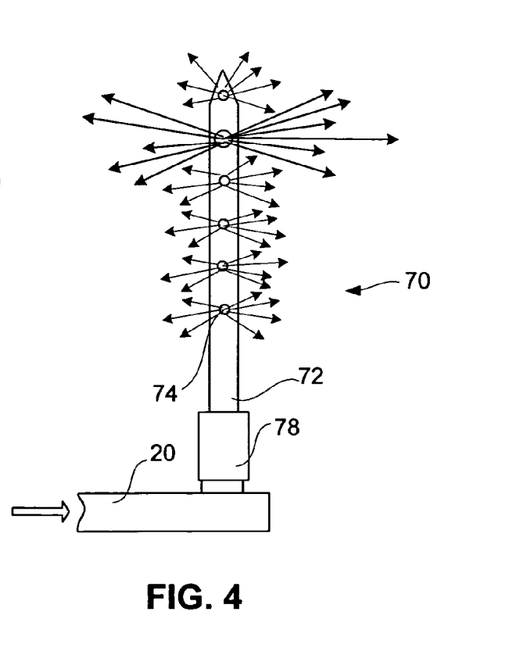
FIG. 4 is a side view of an exemplary infuser unit of FIG. 3 but with its fluid control valve in its open position to release vapor and/or liquid.

FIG. 4 is a side view of an exemplary infuser unit 70 of FIG. 3 but with its fluid control valve 78 pushed down into its open position to release vapor and/or liquid (shown diagrammatically as arrows) through the apertures 74. Other valve designs can be utilized if desired.

Figure 5:
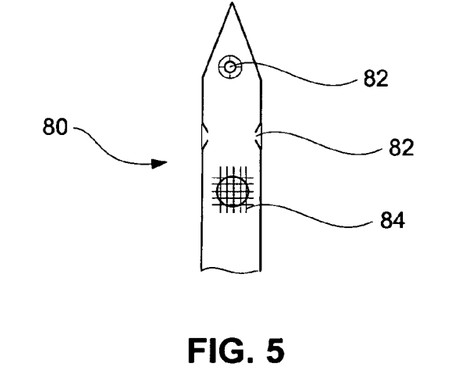
FIG. 5 is a detail showing apertures in an exemplary embodiment of a flavor infuser.

FIG. 5 is a detail side view of an exemplary embodiment of a flavor infuser 80 having countersunk apertures 82 formed in sidewall of its shaft portion 84. Countersinking of the apertures 80 can help to prevent clogging of the apertures, e.g., with bits of food. However, other designs can be implemented to prevent clogging of the apertures (e.g., a mesh 84 placed over the aperture). Indeed different methodologies can be used to keep the apertures unclogged, including flushing the system with a vinegar-water solution after use, scrubbing, etc.

Figure 5A:
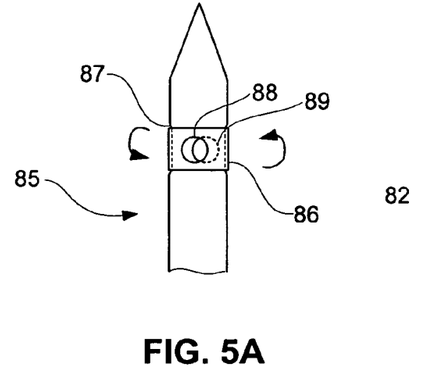
FIG. 5A is a detail showing an exemplary embodiment of a flavor infuser having a twist-type aperture shut off valve.

FIG. 5A is a detail showing an exemplary embodiment of a flavor infuser 85 having a twist-type aperture shut off valve that comprises a collar 86 with a through hole 88. The collar 86 is rotatably mounted around a section 87 of the infuser. The collar 86 is rotatable to align with an aperture 89 in the infuser, and can thus be used as a shut off value. Other types of valves can be used.

Figure 6:
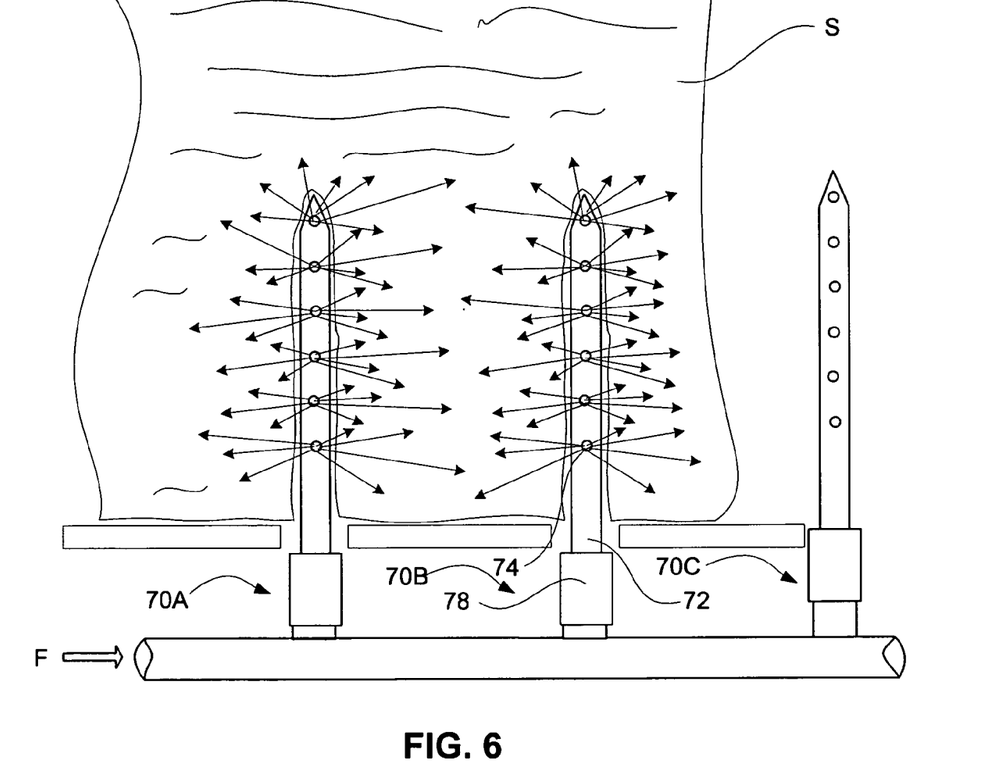
FIG. 6 is a diagrammatic view of the flavor infusion device of FIGS. 3 and 4 used to infuse food.

FIG. 6 is a diagrammatic view of the flavor infusion device of FIGS. 3 and 4 used to infuse food "S" (e.g., a steak). As can be seen, the infusers 70A and 70B penetrate the food "S" and the weight of the food will bear down on the valves 78, causing them to become open. Accordingly, fluid "F" (vapor and heated liquid shown as arrows) will be forced out of the opened infusers 70A and 70B through the apertures 74 and into the food being cooked. This will infuse the food "S" with extra moisture and flavor. However, where the food "S" is not bearing down on the infuser 70C, the infuser remains closed, and no fluid exit therefrom. Of course, if no valves are provided, fluid will freely be released from the apertures.

Figure 7:
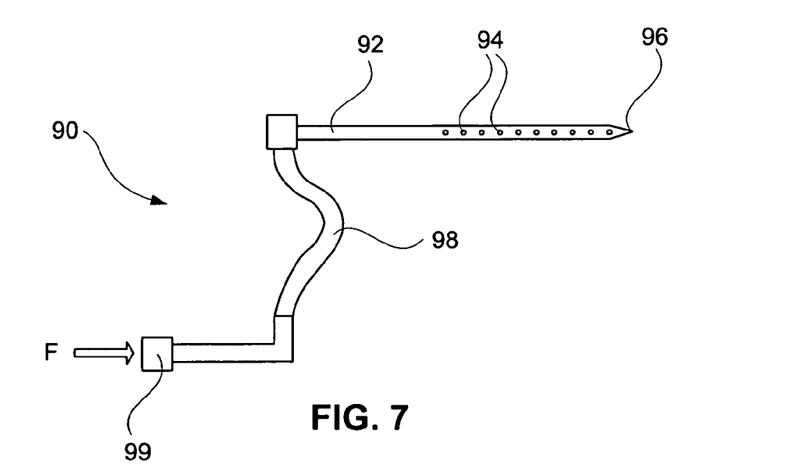
FIG. 7 is a side view of another exemplary infuser of the invention.

FIG. 7 is a side view of another exemplary infuser 90 of the invention with an extra long shaft 92 with a plurality of apertures 94 and relatively sharp tip 96. The shaft will preferably be connected with a flexible and heat resistant conduit 98 to allow the infuser to be placed wherever desired. This infuser 90 is ideal for infusing flavor and moisture into thick foods, such as chicken, turkey, roasts, and the like. This type of infuser can have a coupler 99 so it can be easily attached to the existing conduit.

Figure 8:
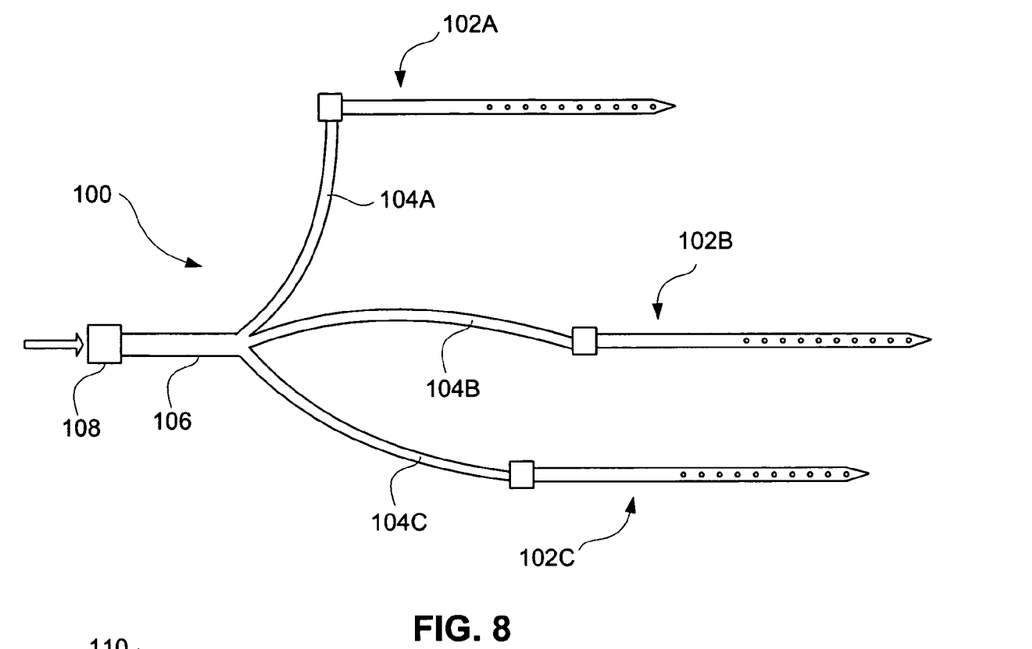
FIG. 8 is a side view of another exemplary infuser of the invention with multiple infusers.

FIG. 8 is a side view of another exemplary infuser unit 100 of the invention with multiple infusers 102A, 102B and 102C, each connected by flexible conduits 104A, 104B and 104C, respectively, and connected in turn to a common conduit 106 which is connected in turn by a coupler 108 to the conduit (not shown). Like the infuser unit 90 of FIG. 7, the infuser can be extra long and are ideal for infusing thick foods and/or irregular shaped foods with flavor and moisture.

Figure 9:
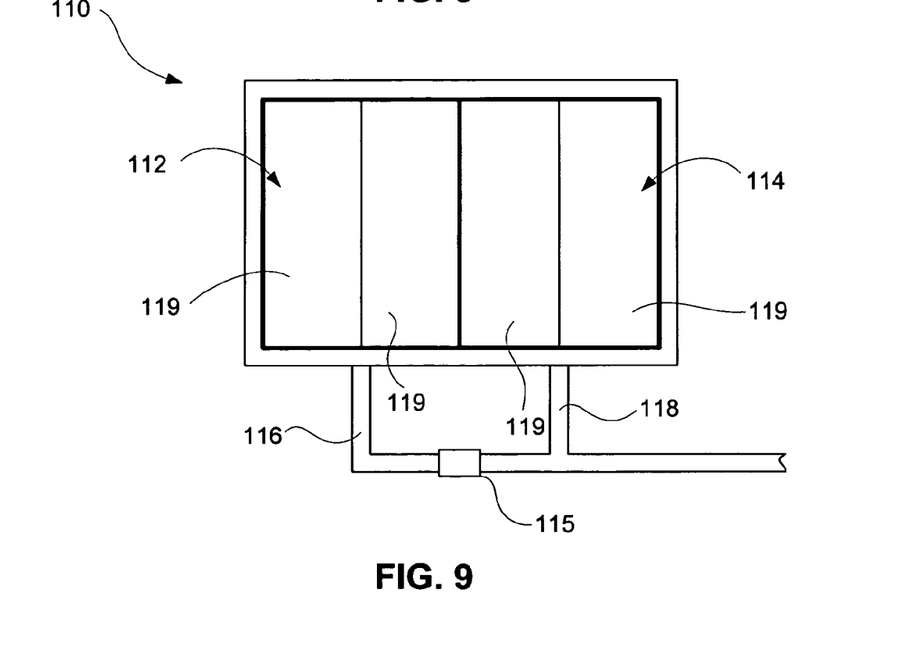
FIG. 9 is a top view of an exemplary reservoir with two compartments.

FIG. 9 is a top view of an exemplary reservoir 110 with two compartments 112 and 114 and two conduits 116 and 118. The two conduits 116 and 118 are shown as joining a common conduit 120. A one-way check valve 115 may be situated between manifolds 116 and 118 to prevent any excess pressure in reservoir 114 from back flowing into reservoir 112. The two compartments 112 can be used to store different fluids that might not readily mix, e.g., oil and water, and can optionally have different heating controls (not shown). Whether or not the reservoir has one or more compartments, the floor or floors 119 of the reservoir can be V-shaped, concave, convex (e.g., non-flat) so that fluid does not puddle and burn when small amounts remain.

Figure 10:
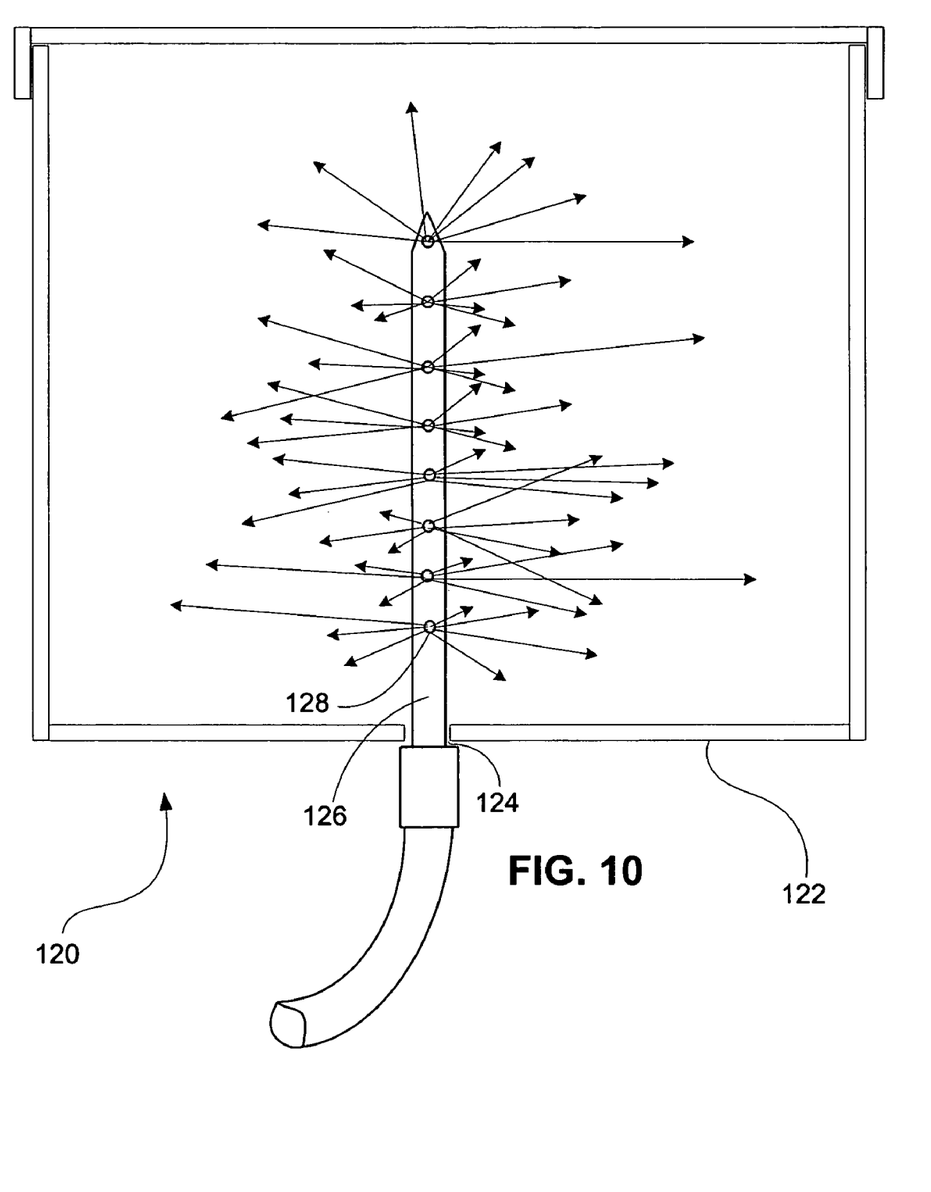
FIG. 10 is an exposed side view of an exemplary embodiment of the flavor infusion device of the invention including an infusion container for food.

FIG. 10 is an exposed side view of an exemplary embodiment of the flavor infusion device 120 of the invention. It includes a container 122 for food. Formed through the container 122 is an aperture 124 for insertion of an infuser 126 having apertures 128 through which fluid will be expelled, thereby marinating and coating food in the container with extra flavor and moisture. The infuser 126 will be connected to a conduit 128 which carries the fluid from the reservoir (not shown).

Figure 11:
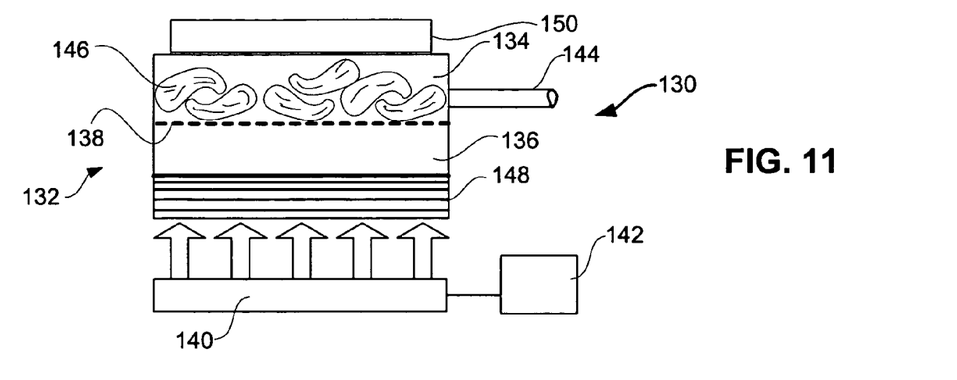
FIG. 11 is an exemplary view of another embodiment of a flavor infusion device of the invention including a two compartment, vertically stacked flavor reservoir.

FIG. 11 is a diagrammatic view of a portion of another exemplary embodiment of a flavor infusion device of the invention including a two compartment, vertically stacked flavor reservoir 132. The flavor reservoir 132 has an upper chamber 134 and a lower chamber 136. A non-solid wall 138 separates the upper and lower compartments 134 and 136, respectively, and can comprise, for example, mesh material, screen, strips of metal, etc. An independent heat source 140 is shown, but the heat source can comprise the same heat source used to heat the food. A control unit 142 is used to control the heat source 140. An outlet conduit 144 connects to the upper compartment 134. In use, a user can place solid flavored item 146 in the upper compartment (e.g., garlic cloves, onion, spices, etc.) and a liquid 148 (e.g. marinade sauce) in the bottom compartment 136. By applying heat, the liquid will turn to vapor and pass over and through the solid items 146 and pick up their flavor(s) and pass through conduit 144 and out through the infusers (not shown). A lid 150 is preferably used to close an open top of the reservoir 132, and the non-solid wall 138 can be removable for ease of cleaning.

Figure 12:
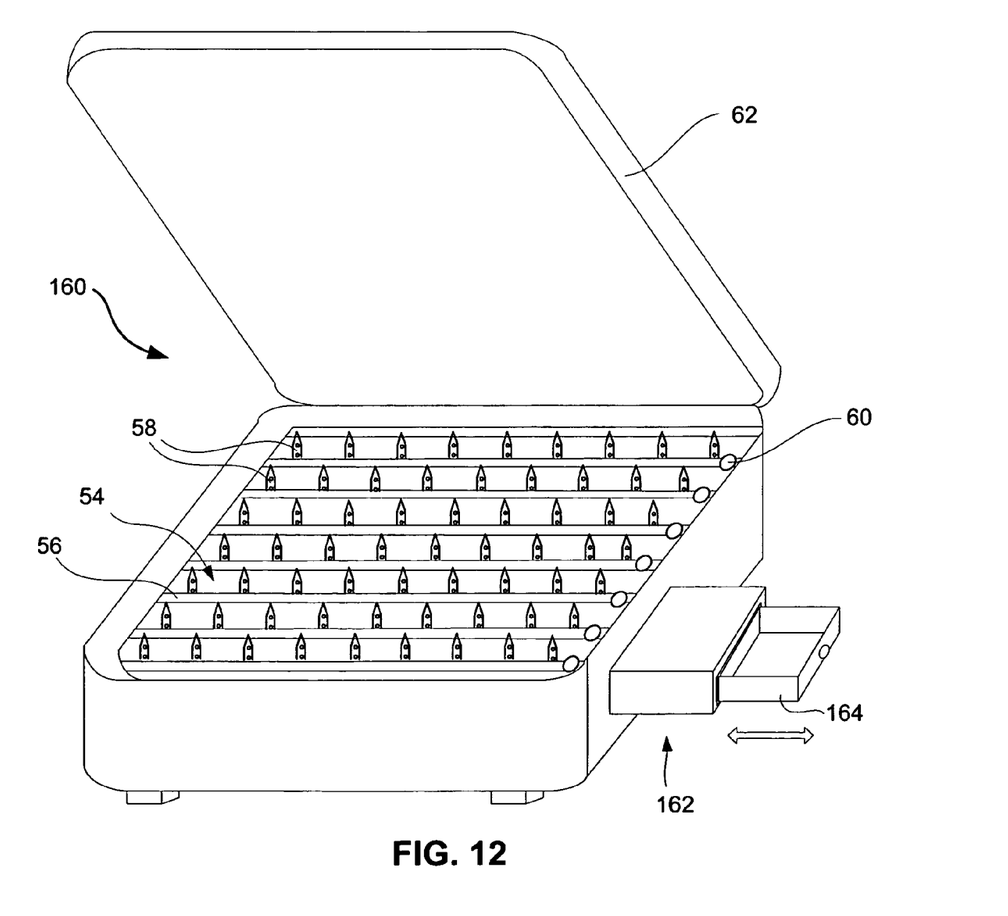
FIG. 12 is a front perspective view of another exemplary grill equipped with the flavor infusion device of the invention having a slide out reservoir tray.

FIG. 12 is a front perspective view of another exemplary grill 160 which is similar to the grill 50 of FIG. 2 (with like reference numerals referring to like features and elements). However, this grill 160 has a flavor reservoir 162 that includes a slide out fluid tray 164 for ease of cleaning and filling with fluid. When slid in, the fluid tray 164 will seal close and/or a door (not shown) will be used to seal the fluid tray inside in the fluid reservoir.

Figure 13A:
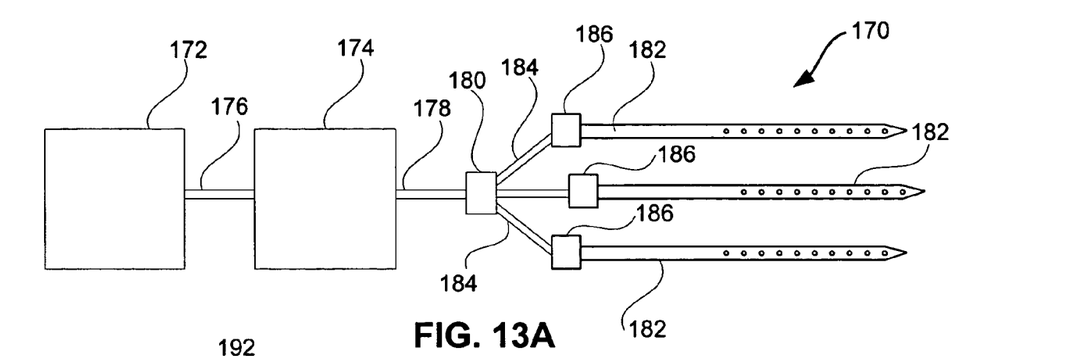
FIG. 13A is a diagrammatic view showing an exemplary series reservoir layout of the flavor infusion device of the invention.

FIG. 13A is a diagrammatic view showing an exemplary series reservoir layout of the flavor infusion device of the invention 170. Reservoirs 172 and 174 are connected in series by a conduit 176 and a conduit 178 exits from reservoir 174 and connects to a junction 180, to which are connected multiple infusers 182 by lines 184 connected to connectors 186.

Figure 13B:
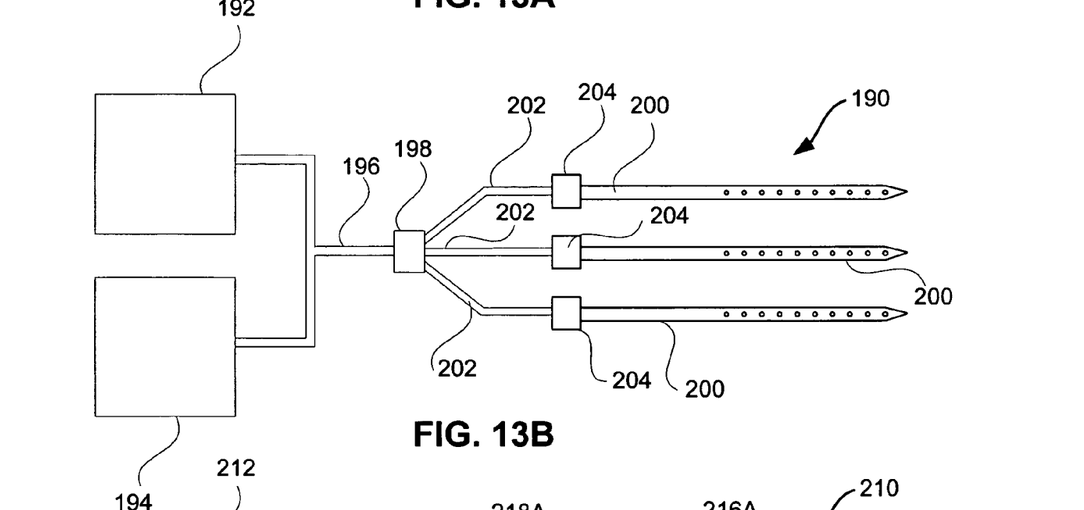
FIG. 13B is a diagrammatic view showing an exemplary parallel reservoir layout of the flavor infusion device of the invention.

FIG. 13B is a diagrammatic view showing an exemplary parallel reservoir layout of the flavor infusion device 190 of the invention. Reservoirs 192 and 194 are connected in parallel by a conduit 196 and connect to a junction 198, to which are connected multiple infusers 200 by lines 202 connected to connectors 204.

Figure 13C:
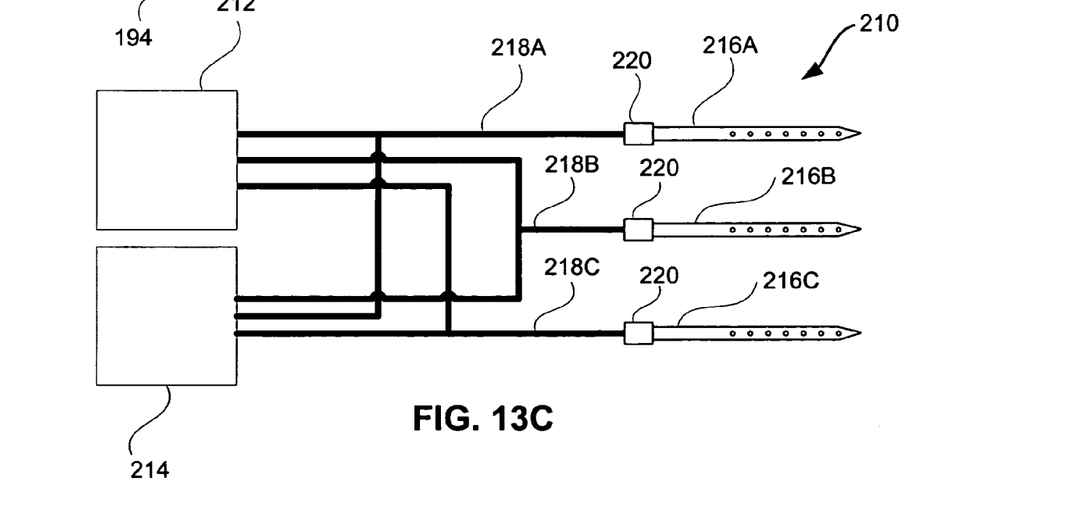
FIG. 13C is a diagrammatic view showing an exemplary multiple parallel reservoir layout of the flavor infusion device of the invention for multiple infusers.

FIG. 13C is a diagrammatic view showing an exemplary multiple parallel reservoir layout of the flavor infusion device 210 of the invention for multiple infusers. Reservoirs 212 and 214 are connected in parallel to multiple infusers 216A, 216B and 216C by conduits 218A, 218B and 218C, respectively. Quick connectors 220 can be used for quickly connecting and disconnecting infusers from the conduits.

The infusers in all of the embodiments are preferably made of a heat resistant material such as metal or ceramic. One advantage of using a metal infuser is that it will tend to transfer heat into the item being cooked, resulting in a faster cooking time. Although the term "flavor reservoir" is used herein, if a user wishes to infuse the item being cooked just with moisture and no added flavor, a non-flavored infusion (e.g. water) can be used.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive.

What is claimed is:

1. A device for infusing heated flavoring vapor into an item being cooked, comprising:

a cooking unit having a heating source configured to deliver cooking heat other than steam heat within an enclosed cooking area of the cooking unit to cook the item being cooked within the enclosed cooking area;

two or more flavor infusers configured to dispense heated flavoring vapor into an interior of the item being cooked;

a heated fluid reservoir configured as a static fluid container and vaporizing chamber to contain a quantity of liquid fluid and one or more flavoring ingredients within or separate from the fluid, and to heat the liquid fluid and the flavoring ingredient(s) within the reservoir to a temperature that produces the heated flavoring vapor;

the fluid reservoir having a flavoring vapor outlet for evacuating the heated flavoring vapor, and being substantially closed against the introduction and recirculation of streaming fluid, thereby allowing the liquid fluid that is statically contained in the fluid reservoir to deplete from the reservoir as it is heated and vaporized without being replenished from a streaming fluid source or a return pathway from the cooking area;

a conduit connecting the infusers and the vapor outlet of the fluid reservoir to allow the heated flavoring vapor generated by heating the liquid fluid and flavoring ingredient(s) in the fluid reservoir to flow to the infusers solely in an outflow direction from the fluid reservoir to the infusers;

the device being operatively configured to isolate the liquid fluid in the fluid reservoir from the heated flavoring vapor that flows from the infusers so as to deliver substantially only the heated flavoring vapor from the infusers into the item being cooked by the heating source; and the device being further configured so that the heating source delivers the cooking heat to the exterior of the item to be cooked in the cooking area independently of the infusers while the infusers separately infuse the heated flavoring vapor into the interior of the item being cooked.

2. The device of claim 1, wherein the fluid reservoir further comprises a reservoir heating source.

3. The device of claim 2, wherein the reservoir heating source is independent of the heating source used to cook the item being cooked.

4. The device of claim 1, wherein each infuser comprises a shaft with at least one aperture therein through which the fluid is expelled.

5. The device of claim 1, wherein each infuser comprises a sharp tip adapted to penetrate into the interior of an item being cooked.

6. The device of claim 4, wherein the at least one aperture in each infuser comprises a recessed hole.

7. The device of claim 4, further comprising mesh overlying the at least one aperture in the infusers.

8. The device of claim 4, wherein the apertures in the infusers can be closed.

9. The device of claim 1, wherein a plurality of apertures are provided in the infusers and the apertures have at least two different sizes.

10. The device of claim 1, wherein a plurality of more than two infusers are provided.

11. The device of claim 1, wherein the infusers are of varied height.

12. The device of claim 1, wherein the infusers are made of a heat conducting material.

13. The device of claim 1, further including a grilling grid.

14. The device of claim 13, wherein the infusers are integrated into the grilling grid.

15. The device of claim 1, wherein the conduit is flexible.

16. The device of claim 1, wherein the conduit is rigid.

17. The device of claim 1, wherein each infuser is downwardly moveable from a first position to a second position, and further comprises a spring loaded valve that is adapted to open when the infuser is pushed down from the first position to the second position, by an item to be cooked that is placed on the infuser.

18. The device of claim 1, wherein the conduit has connections to permit additional lines to be added or subtracted.

19. The device of claim 1, wherein the conduit is connected in series to multiple infusers.

20. The device of claim 19, further providing at least one shutoff valve for at least one infuser.

21. The device of claim 1, wherein the reservoir is connected in series to multiple infusers.

22. The device of claim 1, wherein multiple reservoirs are connected in series to multiple infusers.

23. The device of claim 1, wherein multiple reservoirs are connected in parallel to multiple infusers.

24. The device of claim 1, further comprising a pressure relief valve.

25. The device of claim 1, further comprising a one-way check valve.

26. The device of claim 1, wherein the reservoir comprises a floor that is not flat.

27. The device of claim 1, wherein the reservoir is incorporated into the cooking unit.

28. The device of claim 1, wherein the reservoir shares a heating element with cooking unit.

29. The device of claim 1, wherein the reservoir has an independent heating element.

30. The device of claim 29, wherein the heating element has an independent control unit.

31. The device of claim 1, wherein a single, elongate infuser with multiple apertures is connected to the conduit, and wherein the conduit is flexible.

32. The device of claim 1, wherein a single, elongate infuser with multiple apertures is connected to the conduit by a quick disconnect connector.

33. The device of claim 1, wherein a plurality of elongate infusers with multiple apertures are connected by flexible lines to the conduit, and wherein the conduit is flexible.

34. The device of claim 33, wherein the plurality of elongate infusers with multiple apertures are connected by flexible lines to the conduit by a quick disconnect connector.

35. The device of claim 1, wherein the reservoir comprises a plurality of chambers for holding different fluids and/or solids.

36. The device of claim 1, wherein the reservoir comprises an upper chamber located above a lower chamber, with the upper and lower chamber being separated by a non-solid dividing wall to permit fluid to pass therethrough, and wherein the upper chamber is connected to the conduit.

37. The device of claim 1, wherein the device further comprises a cooking surface for supporting the item being cooked, and wherein the infusers extend through the cooking surface and are adjustably mounted to vary the amount of extension of the infusers through the cooking surface.

38. The device of claim 37, wherein the fluid reservoir is located outside of the cooking unit.

39. The device of claim 37, wherein the fluid reservoir is located inside of the cooking unit.

40. The device of claim 1, wherein the fluid reservoir includes a removable fluid tray.

41. A device for delivering moisture, flavor and heat as heated vapor to the interior potion of an item being cooked, comprising:
    a flavor infuser;
    at least two separate heated flavor reservoirs connected in one of parallel and series with each other, the at least two flavor reservoirs each being configured to contain a quantity of liquid fluid during heating and vaporization thereof within the reservoirs;
    a conduit that connects the flavor infuser to the at least two flavor reservoirs to allow heated vapor generated by heating liquid fluids in the at least two flavor reservoirs to flow to the infuser; and
    the device being operatively configured to isolate the liquid fluids in the at least two flavor reservoirs from the heated vapor that flows from the infuser so as to deliver substantially only heated vapor from the infuser into the item being cooked.

42. The device of claim 41, wherein at least one of the fluid reservoirs includes a removable fluid tray.

43. A device for infusing with heated flavoring vapor an item being cooked, comprising:
    an enclosed cooking unit;
    an infuser located within the cooking unit;
    a heated fluid reservoir outside of the cooking unit configured to contain a quantity of liquid flavoring fluid during heating and vaporization thereof within the reservoir;
    the fluid reservoir having a flavoring vapor outlet for evacuating the heated flavoring vapor, and being substantially closed against the introduction and recirculation of streaming fluid, thereby allowing the liquid fluid that is contained in the fluid reservoir to deplete from the reservoir as it is heated and vaporized without being replenished from a streaming fluid source or a return pathway from the cooking unit;
    and a conduit connecting the infuser and the vapor outlet of the fluid reservoir to allow heated vapor generated by heating fluid in the fluid reservoir to flow solely in an outflow direction from the fluid reservoir vapor outlet to the infuser; and
    the device being operatively configured to isolate liquid fluid in the fluid reservoir from heated vapor that flows from the infuser so as to deliver substantially only heated vapor from the infuser into the item being cooked.

44. The device of claim 43, wherein a plurality of infusers are provided, each having a plurality of apertures through which the heated vapor will pass into the item being cooked.

45. The device of claim 43, wherein the fluid reservoir includes a removable fluid tray.

46. A device for infusing heated vapor into an item being cooked by a cooking unit, comprising:
    two or more infusers configured to dispense heated vapor into an interior of the item being cooked without cooking an exterior of the item being cooked;
    a heated fluid reservoir configured to contain a quantity of liquid fluid during heating and vaporization thereof within the reservoir;
    the fluid reservoir having a flavoring vapor outlet for evacuating the heated flavoring vapor, and being substantially closed against the introduction and recirculation of streaming fluid, thereby allowing the liquid fluid that is contained in the fluid reservoir to deplete from the reservoir as it is heated and vaporized without being replenished from a streaming fluid source or a return pathway from the item being cooked;
    a conduit connecting the infusers and the vapor outlet of the fluid reservoir to allow heated vapor generated by heating the liquid fluid in the fluid reservoir to flow to the infusers solely in an outflow direction from the fluid reservoir vapor outlet to the infusers; and
    the device being operatively configured to isolate liquid fluid in the fluid reservoir from the heated vapor that flows from the infusers so as to deliver substantially only heated vapor 47. The device of claim 46, wherein the fluid reservoir includes a removable fluid tray.

* * * * *